United States Patent [19]

van Lingen

[11] Patent Number: 4,556,194
[45] Date of Patent: Dec. 3, 1985

[54] MOTOR OPERATED VALVE

[75] Inventor: H. Peter van Lingen, Marlboro, Mass.

[73] Assignee: Asahi/America Inc., Mass.

[21] Appl. No.: 671,485

[22] Filed: Nov. 11, 1984

[51] Int. Cl.[4] ............................................. F16K 31/04
[52] U.S. Cl. .................................. 251/129.12; 251/368
[58] Field of Search ................................. 251/134, 368

[56] References Cited

U.S. PATENT DOCUMENTS

| | | | |
|---|---|---|---|
| 2,761,331 | 9/1956 | Buescher | 251/134 X |
| 2,943,706 | 7/1960 | Morgan | 251/134 X |
| 3,216,449 | 11/1965 | Maudlin et al. | 251/134 X |
| 4,398,562 | 8/1983 | Saarem et al. | 251/134 X |

Primary Examiner—Arnold Rosenthal
Attorney, Agent, or Firm—Anthony J. Casella; Gerald E. Hespos

[57] ABSTRACT

An electrically operated valve is provided including a motor securely and non-rotatably mounted to the valve and in communication with the valve stem. A cam also is mounted to the valve stem. A limit switch with a cam follower is mounted to the motor gear housing at a plurality of locations so as to assure non-rotatability. The cam follower is disposed to contact and follow the cam, and to provide a signal for stopping the rotation of the valve stem.

8 Claims, 4 Drawing Figures

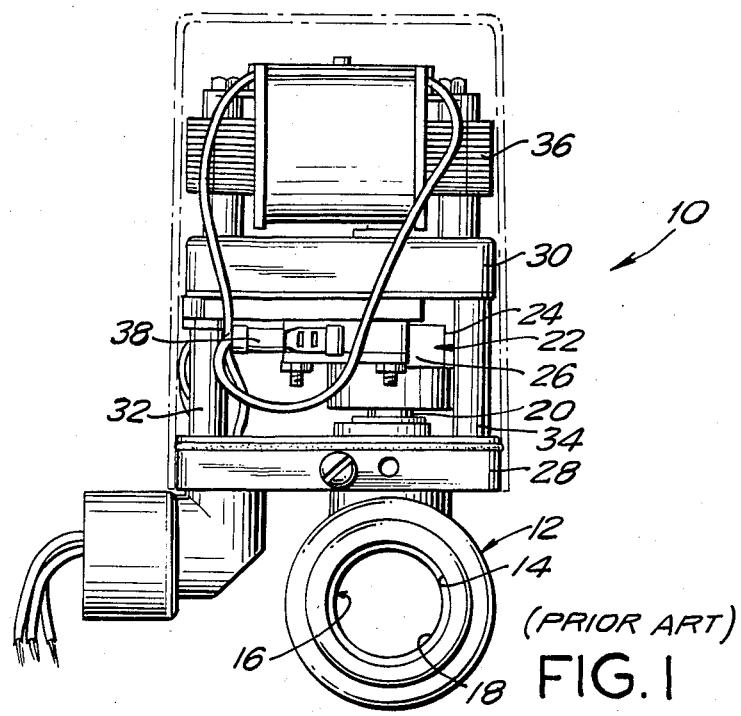
(PRIOR ART) FIG. 1
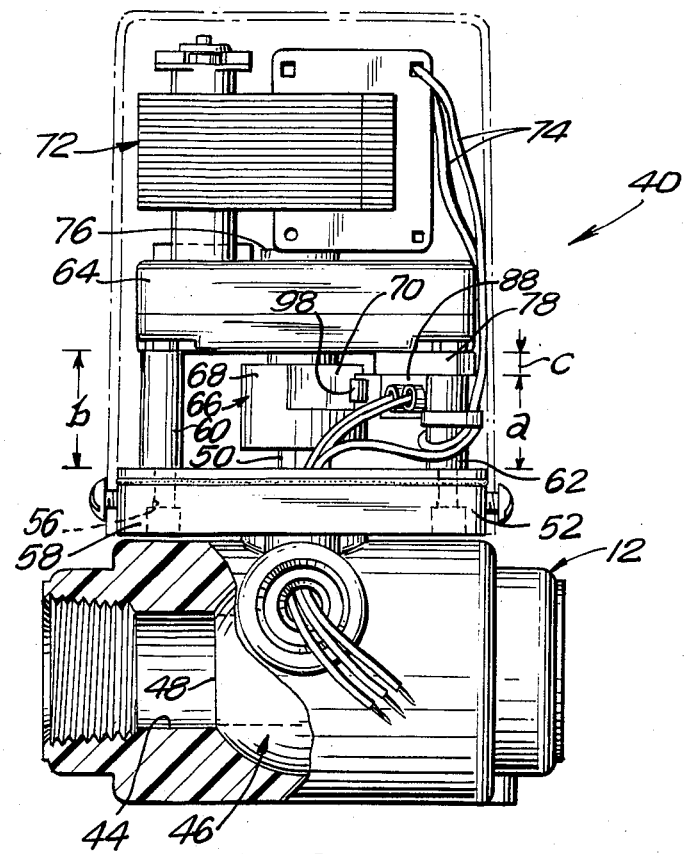
FIG. 2

MOTOR OPERATED VALVE

BACKGROUND OF THE INVENTION

Valves formed from an inert, corrosion resistant thermoplastic material are well suited for use in chemical or chemical engineering systems. These corrosion resistant thermoplastic valves can be used with pipes or tubing formed from the same or similar material to accommodate and precisely control the flow of polycorrosive chemicals. For example, valves of this type often are used to accommodate and control the flow of sulfuric acid, hydrofluoric acid, nitric acid and other oxidizing chemicals as well as caustics, solvents and halogens, to name a few. Frequently, these corrosive liquids are at temperatures as high as 250° F., at pressures of up to 150 p.s.i.

Valves and pipes used in corrosive liquid systems, as described herein typically are formed from a polyvinyl chloride (PVC) or a chlorinated polyvinyl chloride (CPVC). For certain uses, valves and pipes may also be formed from polypropylene or polyvinylindene fluoride (PVDF).

The chemical or chemical engineering systems in which these corrosion resistant thermoplastic valves are used often require a precise on-off sequencing of one or more valves. The valves employed to carry out these on-off functions typically are either ball valves, gate valves, butterfly valves or diaphragm valves. In many instances, the success of a particular chemical engineering operation depends upon the precise and timely on-off sequencing of a plurality of such valves. Stated differently, an incomplete or untimely operation of even one such valve in a system can cause a costly and perhaps dangerous failure of a batch or blend of chemicals.

To facilitate the proper on-off sequenceing of a plurality of valves in a system, it is known to use electrically actuated valves. These electrically operated valves employ an electric motor in place of the more widely known manually rotatable valve handles. The electric motor is in communication with the valve stem such that upon an appropriate electric signal, the motor is activated to rotate the valve stem.

The mode change from opened-to-closed or from closed-to-opened on ball valves and on butterfly valves merely requires the rotation of the valve stem through a 90° angle. A rotation of something other than 90° will result in a valve that is either not completely closed or not entirely opened. Thus, rotation of a valve stem on either a ball valve or a butterfly valve through an angle either less than or greater than 90° could result in a continued small flow of a particular corrosive chemical during periods when that chemical is no longer required. Cponversely certain improper rotations of the valve stem on ball or butterfly valves could result in a less than optimum flow of a particular corrosive chemical when full flow is required.

Limit switches are employed in the prior art electrically operated ball and butterfly valves to control the amount of rotation of the valve stem. Specifically, a portion of the valve stem intermediate the valve and the motor defines a cam which is intended to be in communication with the limit switch of the prior art valve. The outer surface of this cam includes two opposed arc portions defining opposed arc surfaces of a common cylinder joined by two planar chordal surfaces of the same cylinder. The limit switch of the prior art valve includes a feeler that is intended to follow the arcs and chords of the cam as the valve stem rotates. As the feeler moves across the chords of the cam, the distances between the feeler and the axis of the valve stem is intended to vary, thereby causing the angular position of the feeler to vary as well. The feeler of the limit switch is operative to generate a signal in response to appropriate changes in its angular alignment. Thus, in operation, an external signal activates the electric motor of the prior art valve, and causes the valve stem to rotate. As the valves stem rotates the feeler of the limit switch follows the contour of the rotating cam. After a 90° rotation, the feeler should have moved through its maximum range of movement, thereby causing the limit switch to stop the motor.

It has been found through extensive use of the above described prior art valves that systems employing these valves often yield imprecise mixtures and flows of chemicals. More particularly, it has been found that after a period of use, the prior art valves would not always stop in either the precisely opened or the precisely closed position. In certain instances the motor would cause the valve stem to rotate continuously, thereby rapidly switching back and forth between the opened and the closed position of the prior art valve. These improper operations has the potential of causing extremely costly and dangerous failures of many chemical engineering processes. It is believed that a significant proportion of the prior art valve failures have been caused by small, vibration related movements of the limit switch relative to the cam.

Accordingly, it is an object of the subject invention to provide an electrically operated valve that insures efficient and precise opening and closing.

It is another object of the subject invention to provide an electrically operated ball valve that can operate precisely in high vibration environments.

It is a further object of the subject invention to provide an electrically operated ball valve wherein relative vibrational movement between the limit switch and valve stem cam is prevented.

SUMMARY OF THE INVENTION

The subject invention is directed to a valve formed from a corrosion resistant material such as PVC or CPVC. Preferably, the valve is of the ball valve construction with the ball thereof fixedly mounted to a valve stem. The valve stem extends through the wall of the valve, and is generally perpendicular to the direction of flow.

A valve base plate is securely and non-rotationally mounted to the exterior of the valve in proximity to the valve stem. More particularly, the valve base plate defines a planar structure mounted generally orthogonally to the axis of the valve stem. In a preferred embodiment, described in detail below, the valve base plate is provided with an aperture therethrough, and is mounted such that the valve stem extends through the aperture in the valve base plate.

A cam is fixedly mounted to the valve stem. The cam includes two opposed pairs of cam surfaces. A first pair of opposed cam surfaces defines two opposite and equal arcs of a cylinder. The second pair of opposed cam surfaces defines two substantially identical parallel chordal surfaces of the same cylinder. More particularly, the two opposed chordal surface extend between and connect the two opposed arcuate surfaces. Preferably, the axis of the cylinder of the cam is collinear with the axis of the valve stem.

A motor is fixedly mounted in proximity to the cam, and is adapted to rotate the cam and the valve stem attached thereto about their respective longitudinal axes. In a preferred embodiment, as described herein, the motor is securely mounted to a motor gear housing, which in turn is securely maintained in fixed parallel relationship to the valve base plate. More particularly, in the preferred embodiment the motor gear housing and the valve base plate each are provided with at least three apertures disposed such that the apertures in the motor gear housing are in register with the apertures in the valve base plate.

Rigid stand off tubes of substantially equal length are provided to extend between the motor gear housing and valve base plate, and are in line with the registered apertures therein. Bolts are provided to extend through the registered apertures in the motor gear housing and valve base plate and through the stand-off tubes. The combination of bolts and stand-off tubes insures that the motor and the motor gear housing are maintained in fixed relationship with respect to the valve and valve base plate.

A limit switch with a cam follower or feeler is also mounted in fixed relationship to the cam. More particularly, the limit switch is mounted such that the cam follower thereof is in contact with one of the arcuate or chordal surfaces of the cam at all times. The limit switch is operative to stop the motor after 90° of rotation of the valve stem as sensed by the relative position of the cam follower. Thus, the motor will be activated by an external signal and will cause the cam and valve stem to rotate about their common axes. As the cam rotates through 90°, the cam follower will move from an arc surface to a chordal surface of the cam, thereby causing a relative positional change of the cam follower. A change in the relative position of the cam follower corresponding to a 90° rotation of the cam will cause the limit switch to interrupt the operation of the motor. As a result, the motor will stop immediately and precisely after it has rotated the cam and valve stem through a 90° rotation. With the ball valves, this 90° rotation will cause a precise shift from an opened to a closed mode.

As noted above, the ability of the limit switch to precisely stop the rotational movement of the valve stem is dependent upon the position of the limit switch relative to the cam. To insures that the limit switch does not undergo vibrational movements relative to the cam, the limit switch has been fixedly mounted to a limit switch plate at two or more fixed locations thereon. The limit switch plate, in turn, is fixedly mounted at a plurality of locations relative to the cam. More particularly, in the preferred embodiment described further below, the limit switch plate is fixedly mounted at two locations on the motor gear housing. The motor base plate, in turn, is fixedly mounted to the valve base plate at three or more location. Consequently, the plurality of mounting location's prevents relative movement between the limit switch and the cam. To further prevent relative movement between the limit switch and the cam, the limit switch plate can be provided with a reduced thickness area defining at least two planar, orthogonally disposed intersecting surfaces. The limit switch can be mounted to this reduced thickness area in abutting relationship to at least two of the intersecting planar surfaces thereof.

BRIEF DESCRIPTION OF THE DRAWINGS

FIG. 1 is a side elevational view of a prior art valve.
FIG. 2 is a cross-sectional view of the valve of the subject invention.

DETAILED DESCRIPTION OF THE PREFERRED EMBODIMENT

Figure 3:
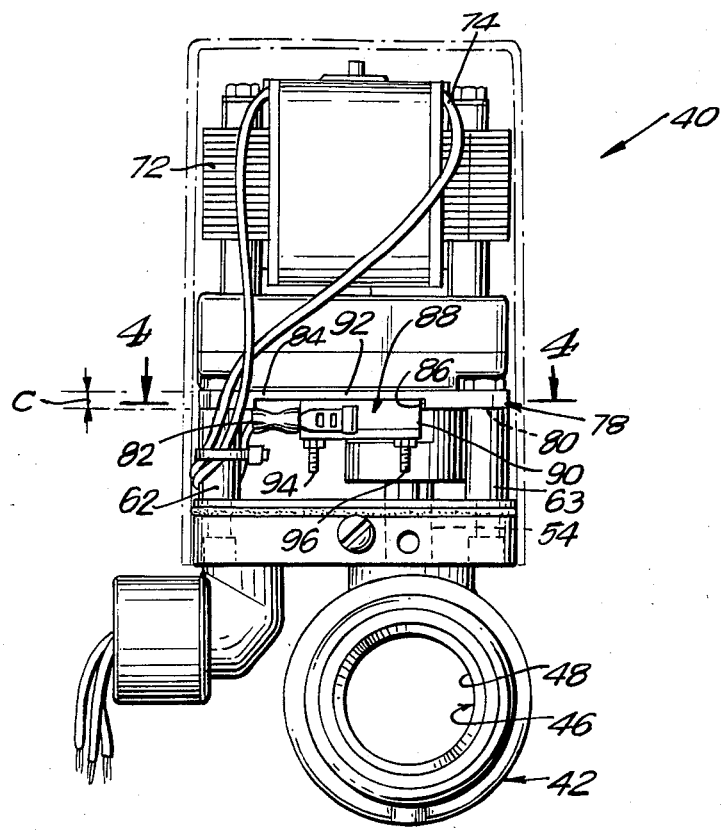
FIG. 3 is a side elevational view of the valve shown in FIG. 2.

A relevant prior art electrically operated ball valve is indicated generally by the numeral 10 in FIG. 1. The prior art valve 10 includes a housing 12 having a generally cylindrical fluid passage 14, and a ball 16 also having a generally cylindrical passage 18. The ball 16 of the prior art valve 10 is mounted to valve stem 20 which in turn is rotationally mounted in the housing 12. FIG. 1 illustrates a first rotational position of valve stem 20 wherein the axes of cylindrical passage 14 and 18 are collinear. In this position, fluid is able to flow through the prior art valve 10. However, the valve stem 20 can be rotated 90° relative to the housing 12, such that the ball 16 completely blocks the passageway 14.

A cam 22 is fixedly mounted to the valve stem 20 on the prior art valve 10. The cam 22, is of generally cylindrical configuration, and has an axis which is substantially collinear with the axis of valve stem 20. Cam 22 includes a pair of opposed arcuate cam surfaces 24 and a pair of parallel planar cam surfaces 26 which define chords of the cylindrical cam 22.

The prior art valve 10 further includes a valve base plate 28 which is mounted to the housing 12. A motor gear housing 30 is maintained in spaced relationship to the valve base plate 28 by support posts 32 and 34. A motor 36 is mounted to one side of the motor gear housing 30, and is operative to rotationally drive the cam 22 and the valve stem 20. A limit switch 38 is mounted to the support post 32 so as to be in proximity to the cam 22 of the prior art valve 10. The limit switch 38 includes a feeler or cam follower (not shown) which is intended to follow the arcuate and planar cam surfaces 24 and 26 respectively of the cam 22, as the cam 22 rotates about its axis. The limit switch 38 is further operative to stop the motor 36 after a movement of the feeler, which, under ideal conditions, corresponds to 90° of rotation of cam 22.

As noted previously, vibrations in or near the prior art valve 10 are capable of causing rotational movement of the limit switch 38 relative to support post 32. As the limit switch 38 rotates about support post 32, the distance between the cam 22 and the cam follower or feeler (not shown) on limit switch 38 varies. As a result of this variation, the ball 16 may not stop in the precise opened or closed position. Extreme movement of the limit switch 38 can render limit switch 38 unable to stop the externally initiated rotational movement of cam 22.

Figure 4:
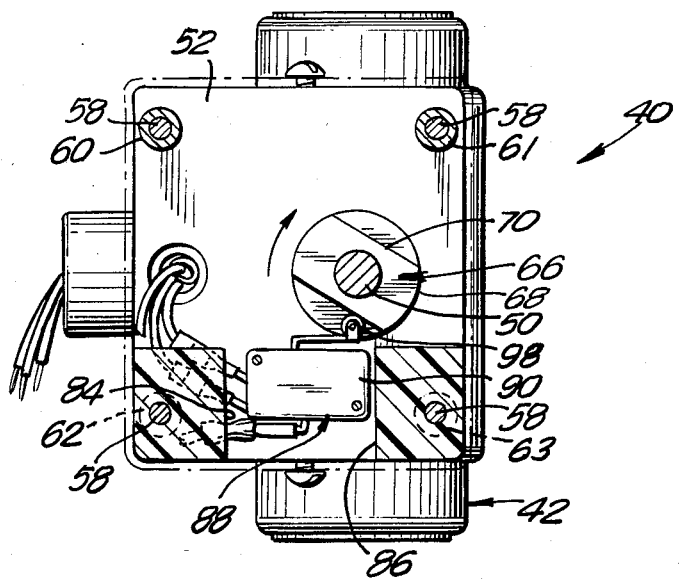
FIG. 4 is a cross-sectional view taken along line 4—4 of FIG. 3.

Turning to FIGS. 2 through 4, the valve of ths subject invention is indicated generally by the numeral 40. The valve 40 includes a housing 42 with a cylindrical channel 44 extending therethrough. A ball 46 is rotationally mounted within housing 42. The ball 46 includes a cylindrical passage 48 with a diameter substantially equal to the diameter of cylindrical passage 44. Valve stem 50 is fixedly mounted to the ball 46 and is aligned perpendicular to the axes of cylindrical passages 44 and 48. Both the valve stem 50 and the ball 46 are rotationally mounted in the housing 42. Additionally, the ball 46 is positioned relative to the housing 42 such that the axis of cylindrical passage 48 therethrough either intersects or is collinear with the axis of cylindrical passage 44. The relative alignment of the axes of cylindrical passages 44 and 48 is determined by the relative angular position of the valve stem 50 and ball 46 relative to housing 42. In operation, when the axes of cylindrical passages 44 and 48 are collinear, the valve 40 enables the maximum flow of fluid. On the other hand, when the axes of cylindrical passages 44 and 48 are intersecting and perpendicular to one another no fluid flows through valve 40.

A substantially planar rectangular valve base plate 52 is fixedly mounted to the outer housing 42. The valve base plate 52 is provided with a centrally located aperture through which the valve stem 50 extends. More particularly, the valve base plate 52 is mounted to the housing 42 such that the valve stem 50 is perpendicular to the plane of valve base plate 52. The valve base plate 52 further includes apertures 56 extending at least partly therethrough and adjacent the four corners thereof respectively. The apertures 56 are adapted to receive and securely retain bolts 58. The bolts 58 extend perpendicularly from the valve base plate 52 and away from the housing 42. Standoff tubes 60, 61, 62 and 63 are mounted over the four bolts 58 respectively. Each standoff tube 60–63 is formed from a rigid material, such as aluminum, and is provided with opposed ends which are substantially perpendicular to the axis of the respective tube. As explained in greater detail below, standoff tubes 62 and 63 are of length "a" which is shorter than the length "b" of standoff tubes 60 and 61.

Motor gear housing 64 is securely mounted in spaced parallel relationship to the valve base plate 52. More particularly the motor gear housing 64 is maintained in fixed parallel relationship to the valve base plate 52 by bolts 58 and by the standoff tubes 60–63. This mounting is such that the bolts 58 prevent the valve base plate and motor gear housing 52 and 64 from moving further apart, while the standoff tubes 60–63 prevent the valve base plate and motor gear housing 52 and 64 from moving closer together. Preferably the motor gear housing 64 is a hollow structure that includes the gears for driving the valve stem 50.

A generally cylindrical cam 66 is fixedly mounted to the valve stem 50. The cam 66 is disposed intermediate the valve base plate and motor gear housing 52 and 64, and is mounted such that the axis of cam 66 is collinear with the axis of valve stem 50. The cam 66 includes a pair of opposed arcuate cam surfaces 68 which define outer cylindrical surfaces of cam 66. Additionally, the cam 66 is provided with a pair of opposed planar parallel cam surfaces 70, each of which defines a chord of the cylindrical cam 66. The planar cam surfaces 70 extend between the arcuate cam surface 68.

Motor 72 is mounted to the surface of motor gear housing 64 opposite cam 66. The motor 72 includes wires 74 which extend to a power source (not shown). Additionally, the motor 72 includes a rotatable drive shaft 76 which extends into the motor base plate 64 and is in communication with the cam 66 and valve stem 50 through gears (not shown) within the motor base plate. The axis of the drive shaft 76 is substantially collinear with the axes of the valve stem 50 and the cam 66. Thus, the motor 72 is operative to rotate the drive shaft 76, thereby causing comparable rotational motion of the cam 66, valve stem 50 and ball 46. In this manner, the motor 72 is able to cause the valve 40 to change from an opened to a closed mode depending upon the angular disposition of the passage 48 in ball 46.

A limit switch plate 78 is securely and non-rotatably mounted to the motor gear housing 64. More particularly the limit switch plate 78 includes a pair of apertures 80 disposed to be in register with the standoffs 62 and 63 and the bolts 58 extending therethrough. The thickness of the limit switch adjacent the apertures 80 therein is indicated by dimension "c" in FIG. 2. The thickness indicated by dimension "c" plus the length of standoff tubes 62 and 63 as indicated by dimension "a" is substantially equal to the length of standoff tubes 60 and 61, as indicated by dimension "b". Thus, the limit switch 78 is securely held adjacent the motor gear housing 64 and contributes to maintaining the motor gear housing and valve base plate 64 and 52 in parallel relationship.

The limit switch plate 78 includes a reduced thickness area on the side thereof opposite the motor base plate 64. The reduced thickness area is defined by planar base wall 82 and planar side walls, 84 and 86. More particularly, the planar base wall 82 is disposed substantially parallel to the motor gear housing 64. The planar base walls 84 and 86 extend perpendicular to base wall 82, and are substantially parallel to the axis of the fluid flow passageway 44 extending through valve 40 and to the axis of valve stem 50.

A limit switch 88 is mounted to the limit switch plate 78. The limit switch 88 includes a housing defined in part by walls 90 and 92 which are perpendicular to one another. The limit switch 88 is mounted in the reduced thickness area of limit switch plate 78 such that the planar surface 92 of limit switch 88 is in face-to-face contact with planar base wall 82 of limit switch plate 78. Additionally, the planar surface 90 of limit switch 88 is in face-to-face contact with the planar side wall 86 of limit switch plate 78. This face-to-face contact between the opposed surfaces of the limit switch 88 and the limit switch plate 78 is maintained by the mounting bolts 94 and 96. Additionally, this secure mounting of the perpendicularly disposed surfaces 90 and 92 of the limit switch 88 to the perpendicularly disposed walls 82 and 86 of the limit switch plate 78 positively prevents rotation of the limit switch 88 relative to the limit switch plate 78.

The limit switch 88 is provided with a cam follower 98. The cam follower 98 is movable relative to the remainder of limit switch 88, and is biased to be in contact with cam 66. Thus, as illustrated best in FIG. 4, the cam follower 98 stays in contact with either the arcuate cam surfaces 68 or the planar cam surfaces 70 as the cam 66 rotates about its axis. In operation, the cam follower 98 will remain substantially stationary during periods when it is following the arcuate cam surfaces 68. However, the cam follower 98 will move relative to the remainder of limit switch 88 as the cam follower 82 follows the planar cam surfaces 70. The limit switch 88 includes a single pole double throw switch mechanism or other similar device which is operable to interrupt the power through wire 74 for operating the motor 72.

In operation, an external signal will activate the motor 72 of valve 40, causing the cam 66 and the valve stem 60 to rotate about their common axes. The cam follower 98 will follow the arcuate and planar cam surfaces 68 and 70. After 90° of rotation of cam 66, the cam follower 98 will move between the arcuate and planar surfaces 68 and 70. This movement will activate a single pole double throw switching mechanism within the limit switch 88, thereby interrupting the power to motor 72. As a result, the rotational movement of the cam 66 and the valve stem 50 will stop.

The precise position of the limit switch 88 with respect to the cam 66 is assured by the mounting of the limit switch plate 78 to the motor gear housing 64 at a plurality of locations. This secure mounting of the limit switch plate 78 prevents rotational movement of the limit switch plate 78 in high vibration environments. Movement of the limit switch 88 relative to the cam 66 is further prevented by the secure mounting of limit switch 88 in the reduced thickness area of the limit switch plate 78. More particularly, the face-to-face contact of perpendicularly aligned surfaces 90 and 92 of the limit switch 88 against the perpendicularly aligned walls 86 and 82 of the limit switch plate 78 substantially precludes rotational movement of the limit switch 88 relative to the limit switch plate 78.

While the invention has been described and illustrated with respect to a preferred embodiment, it is understood that various modifications can be made therein without departing from the scope of the invention which should be defined only by the appended claims.

What is claimed is:

1. An electrically operated thermoplastic valve comprising:
   valve housing means having a fluid flow passage extending therethrough for accomodating the flow of fluid;
   restriction means rotatably mounted in said valve housing means for selectively blocking the fluid flow passage, said restriction means including a stem extending through said valve housing means;
   cam means rigidly mounted to said stem for rotating with said restriction means;
   motor means in communication with said retriction means and operative to rotate said restriction means and said cam;
   a limit switch plate fixedly and non-rotatably mounted to said valve at a plurality of locations, said limit switch plate including a reduced thickness portion defined by a pair of parallel planar side walls and a planar base wall extending perpendicular thereto; and
   a limit switch means fixedly and non-rotatably mounted to said valve and to said limit switch plate at a plurality of locations for selectively stopping the operation of said motor means, said limit switch means including a pair of perpendicularly aligned adjacent walls disposed in face-to-face contact with the base wall and one of said side walls of the reduced thickness portion of said limit switch plate, said limit switch means further including a cam follower in communication with said cam means and movable relative thereto, whereby movement of said cam follower relative to said cam means causes said limit switch means to stop operation of said motor means, and whereby the plurality of mounting locations prevents relative movement between said limmit switch means and said cam means.

2. A valve as in claim 1 wherein said level is a ball valve, and wherein the restriction means defines a ball.

3. A valve as in claim 1 further including a motor gear housing mounted in fixed spaced relationship to said valve body and substantially perpendicular to the rotational axes of said cam, said motor means and said limit switch means being mounted to opposed sides of said motor gear housing.

4. A valve as in claim 3 further including a valve plate fixedly mounted to said valve body means and in spaced parallel relationship to said motor gear housing.

5. A valve as in claim 4 wherein said valve plate and said motor gear housing are maintained in fixed spaced relationship by a plurality of rigid standoff tubes extending perpendicularly between said valve plate and said motor gear housing, each said standoff tube including a bolt means extending centrally therethrough for connecting said valve plate and said motor gear housing.

6. A valve as in claim 5 wherein said limit switch means is retained intermediate said motor gear housing and a plurality of said standoff tubes.

7. A valve as in claim 6 wherein said limit switch means further includes a plurality of apertures extending therethrough and wherein one said bolt means extends through each of said apertures in said limit switch means.

8. An electrically operated thermoplastic valve comprising:
   a thermoplastic valve housing having a fluid flow passage extending therethrough for accomodating the flow of fluid;
   a valve ball rotatably mounted in said valve housing, said valve ball including a fluid flow passage extending therethrough and allignable with the fluid flow passage of said valve housing, said valve ball further including a valve stem extending through said valve housing and perpendicular to the fluid flow passage therein;
   a generally cylindrical cam rigidly mounted to said valve stem such that the axes of said valve stem and said cam are generally collinear, said cam including a pair of opposed parallel cam surfaces defining chordal surfaces of said cam;
   a motor gear housing rigidly mounted in spaced relationship to said valve housing and perpendicular to the axes of said cam and said valve stem;
   an electric motor mounted to said motor gear housing and in communication with said cam and said valve stem for rotating said valve ball relative to said valve housing;
   a limit switch plate securely and non-rotatably mounted in face-to-face relationship with said motor gear housing at a plurality of locations thereon, said limit switch plate including a reduced thickness portion including a planar base wall and a plurality of planar side walls aligned perpendicular to said base wall; and
   a limit switch fixedly and non-rotatably mounted at a plurality of locations in the reduced thickness portion of said limit switch plate such that said limit switch is disposed in abutting relationship to a plurality of the walls defining the reduced thickness portion of said limit switch plate, said limit switch including a cam follower biased into communication with said cam and movable relative thereto, whereby movement of said cam follower relative to said cam is operative to stop the electric motor.

* * * * *